US009954604B2

(12) United States Patent
Khidre et al.

(10) Patent No.: US 9,954,604 B2
(45) Date of Patent: Apr. 24, 2018

(54) SYSTEM AND METHODS FOR ENABLING SIMULTANEOUS TRANSMIT AND RECEIVE IN THE SAME WIFI BAND WITHIN A DEVICE

(71) Applicant: Aruba Networks, Inc., Sunnyvale, CA (US)

(72) Inventors: Ahmed Khidre, Cupertino, CA (US); Deven Mohan Patel, San Jose, CA (US); Farhan Hasnain, Santa Clara, CA (US); Prakash Guda, Fremont, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 226 days.

(21) Appl. No.: 14/170,287

(22) Filed: Jan. 31, 2014

(65) Prior Publication Data

US 2014/0355491 A1 Dec. 4, 2014

Related U.S. Application Data

(60) Provisional application No. 61/829,977, filed on May 31, 2013.

(51) Int. Cl.
*H04B 7/00* (2006.01)
*H04B 7/24* (2006.01)
(Continued)

(52) U.S. Cl.
CPC ............... *H04B 7/24* (2013.01); *H04B 1/525* (2013.01); *H04L 27/0006* (2013.01); *H04W 84/12* (2013.01)

(58) Field of Classification Search
None
See application file for complete search history.

(56) References Cited

U.S. PATENT DOCUMENTS 8,509,687 B1 * 8/2013 Clement .............. H04B 17/318
455/11.1
2007/0072567 A1 * 3/2007 Nagai ...................... H01Q 3/26
455/205
(Continued)

FOREIGN PATENT DOCUMENTS

WO WO 2011010458 A1 * 1/2011 ........... H04B 1/7163

*Primary Examiner* — Jutai Kao
(74) *Attorney, Agent, or Firm* — Hewlett Packard Enterprise Patent Department

(57) ABSTRACT

Disclosed herein, one embodiment of the disclosure is directed to a system, apparatus, and method for enabling simultaneous transmit and receive in the same Wi-Fi band within a device by first obtaining a first information corresponding to a first set of signals to be transmitted wirelessly by a first antenna of a first device and transmitting, by the first antenna of the first device, the first set of signals. Then, a second set of signals comprising: (a) the first set of signals transmitted by the first antenna of the first device and (b) a third set of signals transmitted by a second device different than the first device are received by a second antenna of the first device. Thereafter, a second information representing the second set of signals received by the second antenna of the first device is obtained. Last, based on the first information and the second information, a third information comprising an estimation of the third set of signals without the first set of signals is determined.

20 Claims, 3 Drawing Sheets

(51) Int. Cl.
*H04B 1/525* (2015.01)
*H04W 84/12* (2009.01)
*H04L 27/00* (2006.01)

(56) References Cited

U.S. PATENT DOCUMENTS

| | | | |
|---|---|---|---|
| 2007/0142089 A1* | 6/2007 | Roy | H04B 7/0848 455/562.1 |
| 2009/0227213 A1* | 9/2009 | Sadeghfam | H04B 1/525 455/78 |
| 2010/0141530 A1* | 6/2010 | McMahon | H01Q 1/246 342/417 |
| 2010/0173586 A1* | 7/2010 | McHenry | H04L 27/0006 455/62 |
| 2012/0140793 A1* | 6/2012 | Demessie | H04B 1/7163 375/130 |
| 2012/0275354 A1* | 11/2012 | Villain | H04L 27/0006 370/281 |
| 2013/0155913 A1* | 6/2013 | Sarca | H04B 1/40 370/277 |

\* cited by examiner

SYSTEM AND METHODS FOR ENABLING SIMULTANEOUS TRANSMIT AND RECEIVE IN THE SAME WIFI BAND WITHIN A DEVICE

CROSS REFERENCE TO RELATED APPLICATIONS

The present application claims priority to U.S. Provisional Patent Application No. 61/829,977, filed May 31, 2013, entitled "Enabling Simultaneous Transmit And Receive In The Same Wifi Band Within A Device," the content of which is hereby incorporated by reference in its entirety for all purposes.

FIELD

The present disclosure relates to wireless network devices. In particular, an embodiment of the present disclosure relates to a system and method for enabling simultaneous transmit and receive in the same Wi-Fi band within a device.

BACKGROUND

In an operation environment where two or more wireless network devices (such as wireless access points or mesh nodes) are operating within the interference ranges of each other on the same radio frequency (RF) band, it is preferable for each of the wireless network devices to operate on the RF channel with the least interference from other wireless network devices in the vicinity, thereby improving the capacity and performance of the system.

To determine which RF channel has the least interference from other wireless network devices in the vicinity, a wireless network device audits the whole spectrum of the RF band by performing a spectrum scan. Once the RF channel with the least interference is determined, the wireless network device, under the control of an internal or an external controller, switches over to the preferred RF channel.

A wireless network device with only one radio unit temporarily suspends its activity with associated client devices in order to perform a spectrum scan. While wireless network devices with two or more radio units are becoming increasingly common, with these devices, it is still impossible to simultaneously provide connectivity to client devices with one radio unit and perform the spectrum scan with a second radio unit with conventional methods because signals transmitted by the radio unit providing user access are received by the radio unit attempting to perform the spectrum scan. The radio unit attempting to perform the spectrum scan with conventional methods cannot successfully receive and decode signals from other wireless network devices in the vicinity due to receiver compression caused by the strong signal components corresponding to signals transmitted by the radio unit providing connectivity to client devices in the received signals.

BRIEF DESCRIPTION OF THE DRAWINGS

Embodiments of the disclosure may best be understood by referring to the following description and accompanying drawings that are used to illustrate embodiments of the disclosure by way of example and not limitation. In the drawings, in which like reference numerals indicate similar elements.

DETAILED DESCRIPTION

Figure 1:
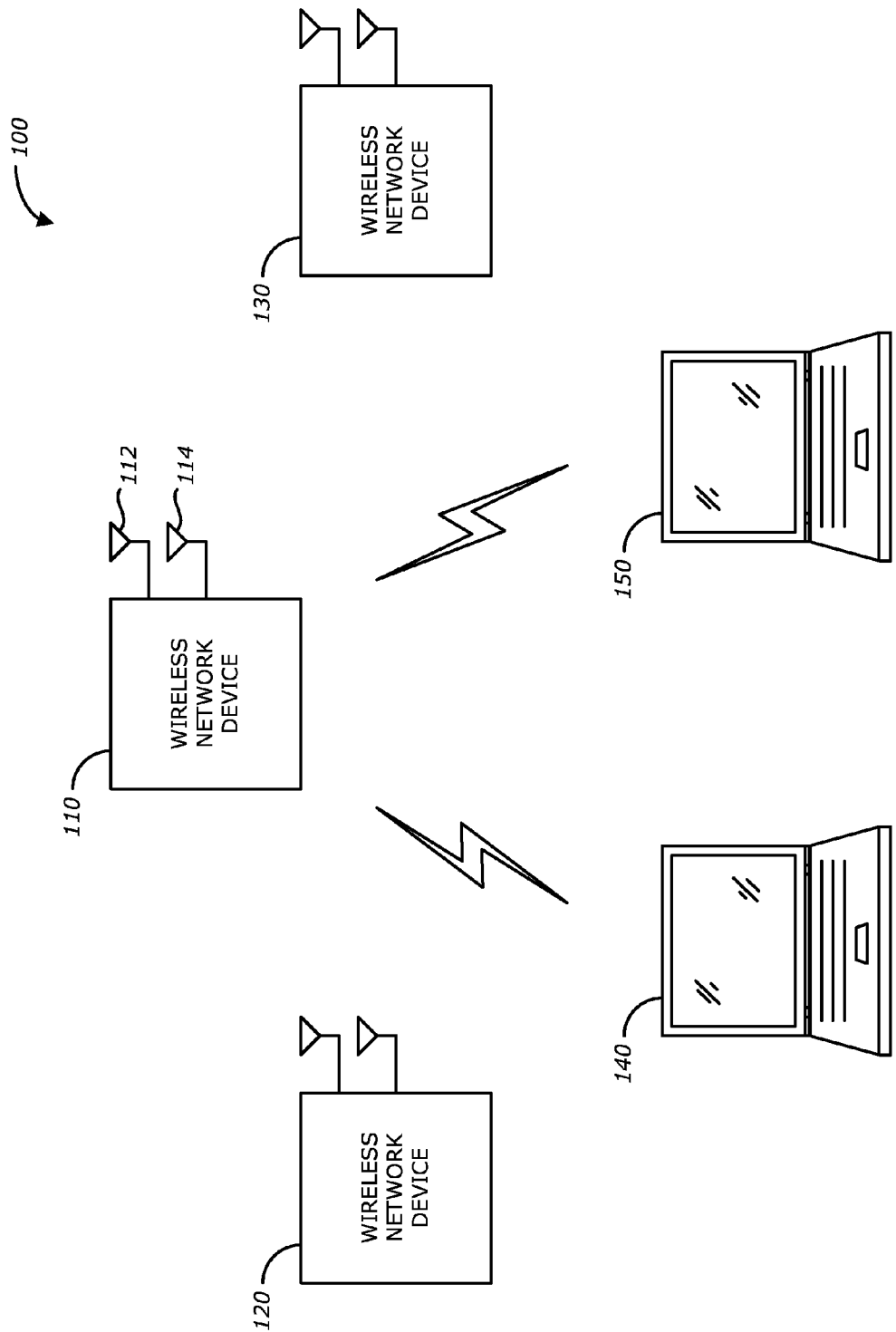
FIG. 1 illustrates an exemplary hardware environment in which embodiments of the disclosure may be practiced.

In the following description, numerous specific details are set forth. However, it is understood that embodiments of the disclosure may be practiced without these specific details. In other instances, well-known circuits, structures, and techniques have not been shown in detail in order not to obscure the understanding of this description.

Disclosed herein, one embodiment of the disclosure is directed to a system, apparatus, and method for enabling simultaneous transmit and receive in the same wireless fidelity (Wi-Fi) band within a device. The enablement of simultaneous transmit and receive in the same Wi-Fi band within a device is achieved by first obtaining a first information corresponding to a first set of signals to be transmitted wirelessly by a first antenna of a first device and transmitting, by the first antenna of the first device, the first set of signals. Then, a second set of signals comprising: (a) the first set of signals transmitted by the first antenna of the first device and (b) a third set of signals transmitted by a second device different than the first device are received by a second antenna of the first device. Thereafter, a second information representing the second set of signals received by the second antenna of the first device is obtained. Last, based on the first information and the second information, a third information comprising an estimation of the third set of signals without the first set of signals is determined.

Of course, other features and advantages of the disclosure will be apparent from the accompanying drawings and from the detailed description that follows below.

In the following description, certain terminology is used to describe features of the disclosure. For example, in certain situations, the term "logic" is representative of hardware, firmware and/or software that is configured to perform one or more functions. As hardware, logic may include circuitry having data processing or storage functionality. Examples of such circuitry may include, but are not limited or restricted to a microprocessor, one or more processor cores, a programmable gate array, a microcontroller, an application specific integrated circuit, a wireless receiver, transmitter and/or transceiver circuitry, a semiconductor memory, or a combinatorial logic.

Logic may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, a hard disk drive, an optical disc drive, or a portable memory device. As firmware, the executable code is stored in persistent storage.

FIG. 1 illustrates an exemplary hardware environment 100 in which embodiments of the disclosure may be practiced. Exemplary wireless network device 110 is provided. Wireless network device 110 may be, for example, a wireless access point operating in accordance with one or more protocols in the IEEE 802.11 family of protocols. Wireless network device 110 is situated within the interference ranges of wireless network devices 120 and 130, which are located nearby. Additional wireless network devices not shown in FIG. 1 may also be present. Wireless network devices 110, 120, and 130 each operates on one or more RF bands and share at least one RF band. Examples of RF bands on which wireless network devices 110, 120, and 130 operate may include the 2.4 GHz and the 5 GHz industrial, scientific, and medical (ISM) radio bands. Wireless network device 110 is equipped with a plurality of antennas, such as antennas 112 and 114. Wireless network devices 120 and 130 shown in FIG. 1 may be similarly equipped with multiple antennas. The number of antennas does not limit the disclosure.

Each of the wireless network devices 110, 120, and 130 is connected to a data network (not shown), either directly or indirectly, and is capable of providing wireless data connectivity to client devices through RF communications. At any time, each of the wireless network devices 110, 120, and 130 is associated with zero, one, or more client devices. In the exemplary environment shown in FIG. 1, wireless network device 110 is associated with client devices 140 and 150. Examples of client devices 140 and 150 may include laptops, cellphones, tablets, game consoles, smart TVs, set-top boxes, etc.

Of course, it should be understood that the present disclosure is not limited by the number of wireless network devices present, the antenna configurations of the wireless network devices, the RF bands used, the communication protocols used, the number of the client devices, or the types of client devices with which each of the wireless network devices is associated.

Throughout the disclosure, alternatively, wireless network device 110 may be referred to as the first device; wireless network device 120 may be referred to as the second device; and wireless network device 130 may be referred to as the third device. Moreover, antenna 112 may be referred to as the first antenna, and antenna 114 may be referred to as the second antenna.

Figure 2:
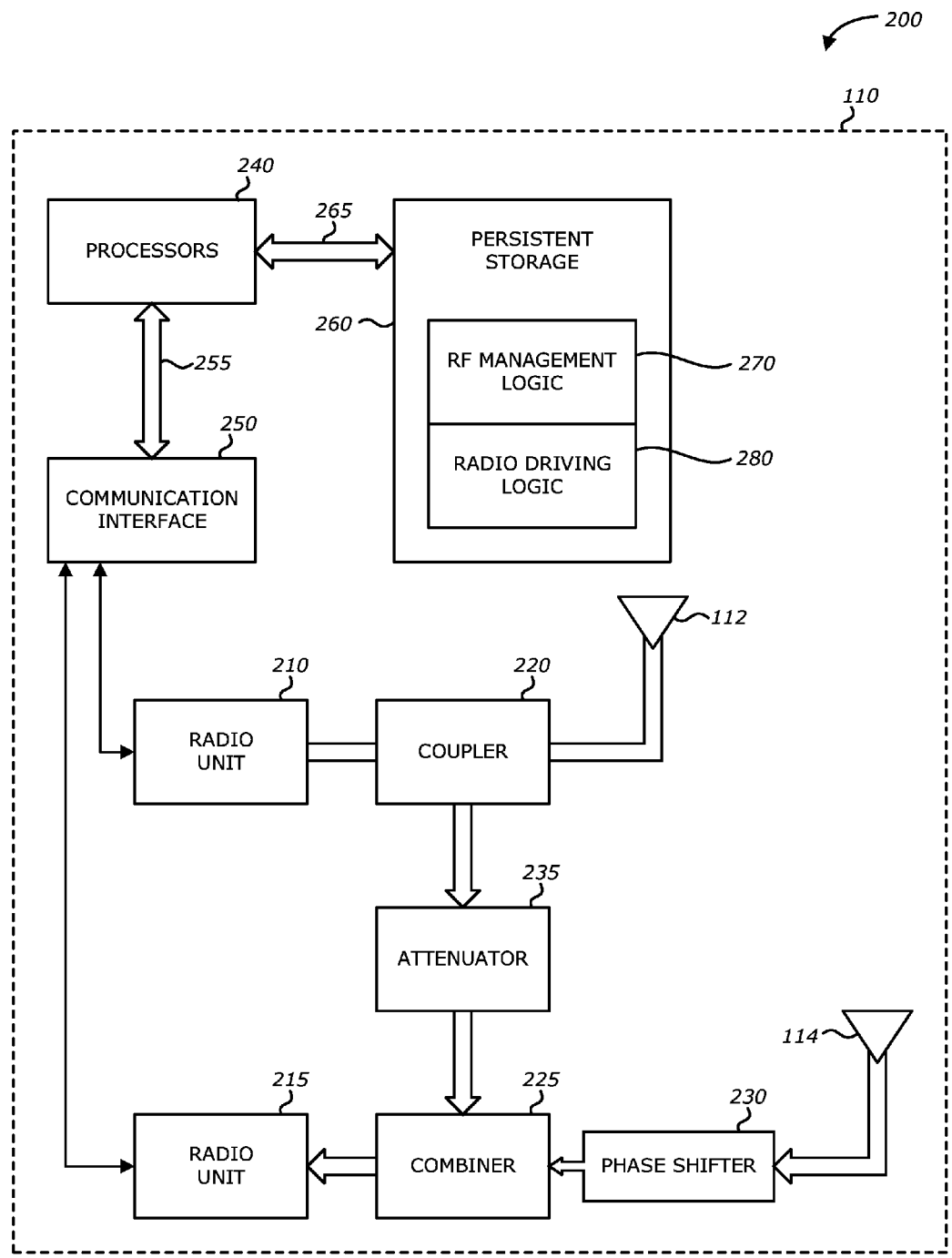
FIG. 2 is an exemplary block diagram of logic associated with a wireless network device.

Referring now to FIG. 2, an exemplary block diagram 200 of logic associated with wireless network device 110 is shown. Wireless network device 110 comprises one or more processors 240 that are coupled to communication interface logic 250 via a first transmission medium 255. Communication interface logic 250 enables communications with the data network (not shown), and possibly with an external controller (not shown). Furthermore, communication interface logic 250 is also coupled to radio units 210 and 215. Additionally, communication interface logic 250 may comprise a physical interface including one or more ports for wired connectors.

Processor 240 is further coupled to persistent storage 260 via transmission medium 265. According to one embodiment of the disclosure, persistent storage 260 may include RF management logic 270 and radio driving logic 280. Of course, when implemented as hardware, RF management logic 270 and radio driving logic 280 would be implemented separately from persistent memory 260.

Radio units 210 and 215 are coupled to antennas 112 and 114, respectively. Coupler 220 is coupled to the transmission medium between radio unit 210 and antenna 112, while combiner 225 and phase shifter 230 are coupled to the transmission medium between radio unit 215 and antenna 114. Coupler 220 and combiner 225 are connected via attenuator 235. As will be described below, phase shifter 230 may also be situated between coupler 220 and antenna 112 or between coupler 220 and combiner 225 (either before or after attenuator 235) in alternative embodiments. In some embodiments, some or all of coupler 220, phase shifter 230, attenuator 235, and combiner 225 may be implemented within the same hardware component.

It should be understood, as explained above, that the present disclosure is not limited by the radio and antenna configuration within wireless network device 110. For example, radio units 210 and 215 may each be coupled to more than one antennas, and may share one or more antennas. Moreover, more radio units in addition to radio units 210 and 215 are possible.

In one embodiment of the disclosure, radio unit 210 is engaged in providing data connectivity to client devices through RF communications on an RF band, while radio unit 215 is attempting to perform a spectrum scan simultaneously on the same RF band. In some embodiments, radio unit 215 may be a band-selectable dual- or multi-band radio unit that may be configured to alternate between providing data connectivity on an RF band different from the RF band of radio unit 210 and performing a spectrum scan on the RF band on which radio unit 210 is operating. Absent coupler 220, combiner 225, phase shifter 230, and attenuator 235, signals transmitted by radio unit 210 through antenna 112 would be received by radio unit 215 via antenna 114, causing receiver compression in radio unit 215 because signal components corresponding to signals transmitted by radio unit 210 in the signals received by antenna 114 are too strong. As a result of receiver compression, radio unit 215 is unable to receive and decode signals from neighboring wireless network devices 120 and 130, and the spectrum scan fails.

The present disclosure enables radio unit 215 to receive and decode signals from wireless network devices 120 and/or 130 by canceling out signals transmitted from antenna 112 in the signals received by antenna 114 before radio unit 215 receives the signals. By canceling out signal components corresponding to signals transmitted by radio unit 210, receiver compression is prevented from occurring in radio unit 215. One embodiment of the present disclosure utilizes coupler 220, combiner 225, phase shifter 230, and attenuator 235 to cancel out the signal components corresponding to signals transmitted by radio unit 210 in the signals received by antenna 114.

Absent coupler 220, combiner 225, phase shifter 230, and attenuator 235, signals transmitted by radio unit 210 may be received by radio unit 215 via a plurality of paths. For example, in a first path, signals transmitted by radio unit 210 are radiated through antenna 112 and are received by radio unit 215 through antenna 114 as a result of antenna to antenna coupling between antenna 112 and 114. In a second path, signals transmitted by radio unit 210 are received by radio unit 215 through an unintended parasitic coupling of RF paths between radio unit 210 and radio unit 215. In one embodiment of the present disclosure, the unintended parasitic coupling of RF paths between radio units is minimized through design choices.

In one embodiment of the disclosure, as a result of physics of radio wave propagation, RF propagation from antenna 112 to antenna 114 is associated with an antenna to antenna isolation and a phase shift. Hereinafter, the antenna to antenna isolation is represented by a first decibel level (e.g., "X" dB), and the phase shift is represented by a first angle (e.g., "φ" degrees). Signals transmitted by radio unit 210 through antenna 112 are sampled with a sampling mechanism, such as coupler 220 coupled to the transmission medium between radio unit 210 and antenna 112. A sampling loss is associated with coupler 220. The sampling loss is represented by a second decibel level (e.g., "Y" dB). Attenuator 235 is configured to attenuate output signals from coupler 220 by (X−Y) dB (X should be greater than Y). Moreover, signals received by antenna 114 are fed into a phase shifter 230 configured to shift the phase of the signals by (180−φ) degrees. In some embodiments, attenuator 235 and phase shifter 230 are programmable components, and their parameters may be dynamically adjusted during operation based on real-time RF measurements. Output signals from attenuator 235 and phase shifter 230 are combined in combiner 225. Finally, output signals from combiner 225 are fed into radio unit 215.

Throughout the disclosure, alternatively, signals transmitted by radio unit 210 may be referred to as the first set of signals; signals received by antenna 114 may be referred to as the second set of signals; signals transmitted by wireless network device 120 may be referred to as the third set of signals.

As described above, output signals from attenuator 235 and signal components corresponding to signals transmitted by radio 210 in output signals from phase shifter 230 are exact replicas of each other but 180 degrees out of phase. By combining output signals from attenuator 235 and output signals from phase shifter 230 in combiner 225, strong signal components corresponding to signals transmitted by radio unit 210 are canceled out. Therefore, radio unit 215 is capable of receiving and decoding signals transmitted by wireless network devices 120 and 130 without experiencing receiver compression.

Figure 3:
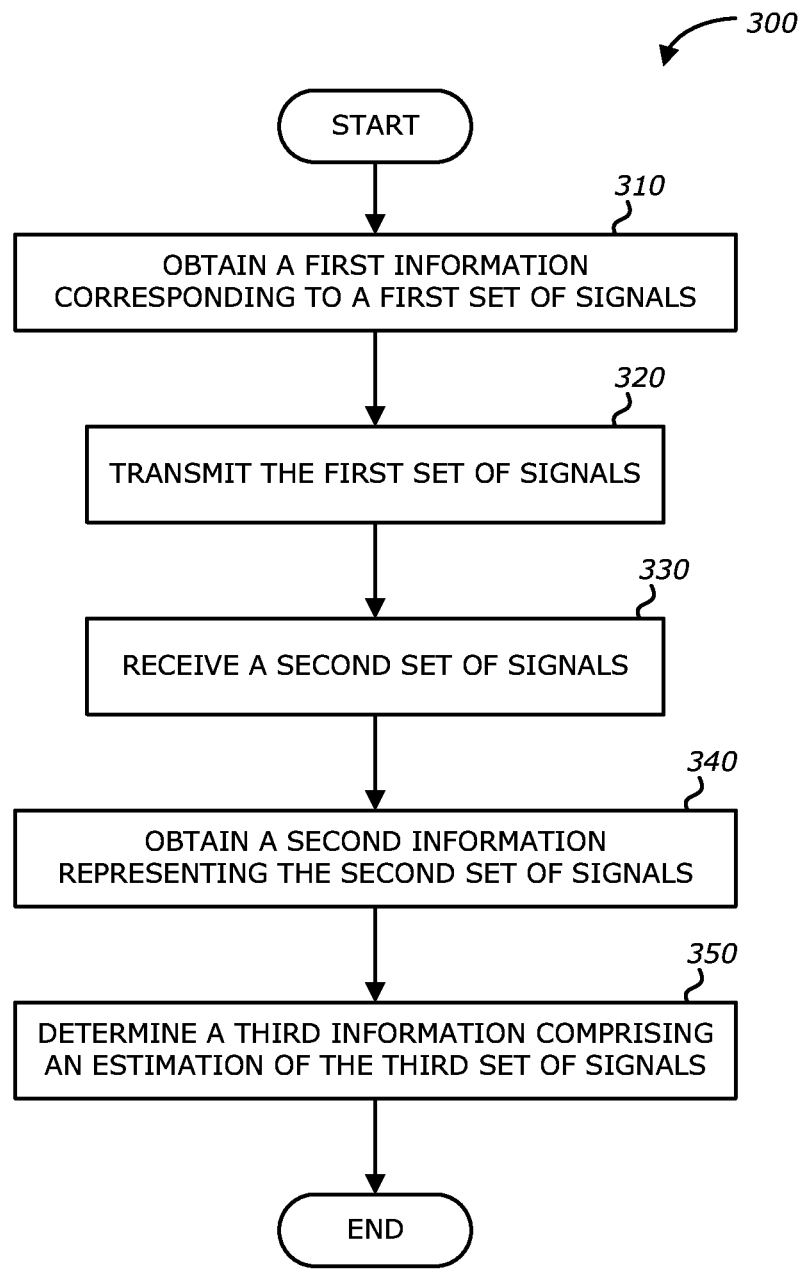
FIG. 3 is an exemplary flow diagram of a method for enabling simultaneous transmit and receive in the same Wi-Fi band within a device.

Referring now to FIG. 3, an exemplary flow diagram 300 of a method for enabling simultaneous transmit and receive in the same Wi-Fi band within a device is shown. The exemplary method for performing a spectrum scan while simultaneously providing wireless data connectivity within the same wireless network device utilizes coupler 220, phase shifter 230, attenuator 235, and combiner 225 of FIG. 2, as described above. At block 310, a first information corresponding to a first set of signals to be transmitted wirelessly by a first antenna 112 of a first device 110 is obtained with coupler 220; at block 320, the first set of signals are transmitted by the first antenna 112 of the first device 110; at block 330, a second set of signals comprising: (a) the first set of signals transmitted by the first antenna 112 of the first device 110 and (b) a third set of signals transmitted by a second device 120 different than the first device 110 are received by a second antenna 114 of the first device 110; at block 340, a second information representing the second set of signals received by the second antenna 114 of the first device 110 is obtained; and at block 350, based on the first information and the second information, a third information comprising an estimation of the third set of signals without the first set of signals is determined through the combined use of attenuator 235, phase shifter 230, combiner 225, radio unit 215, and one or more processors 240, as described above.

In one alternative embodiment (not shown), all else being the same, phase shifter 230 is instead situated between coupler 220 and antenna 112, such that signals radiated from antenna 112 are phase shifted by (180−φ) degrees. In this embodiment, the end results are the same as in the embodiments described above. Phase-shifting signals transmitted by radio unit 210 before they are radiated through antennas coupled to radio unit 210 is useful in configurations where more than one antennas are coupled to radio unit 210, as will be described below. In yet another embodiment also suitable for configurations with more than one transmit antennas coupled to radio unit 210, phase shifter 230 may be situated between coupler 220 and combiner 225 (either before or after attenuator 235).

In embodiments where radio unit 210 is coupled to two or more antennas in a multiple-input multiple-output (MIMO) configuration, each antenna coupled to radio unit 210 is provided with its respective coupler, attenuator, and phase shifter. The phase-shifting may be applied to signals to be radiated through a transmit antenna via a phase shifter situated between the coupler and the antenna, or may be applied to signals sampled by the coupler via a phase shifter situated between the coupler and the combiner, either before or after the signals are attenuated. Therefore, signals to be radiated by each antenna are separately sampled, attenuated, and phase-shifted based on RF propagation-related parameters, as described above. Attenuated signals are combined with signals received by antenna 114, and output signals from the combiner are fed into radio unit 215. All the signals transmitted by radio unit 210 are thereby canceled out.

Although FIGS. 2 and 3 illustrate an embodiment of the disclosure where radio unit 210 provides wireless data connectivity to wireless client devices and radio unit 215 performs the spectrum scan, either radio unit may assume either role in an alternative embodiment where one or more additional sets of couplers, attenuators, combiners, and phase shifters are suitably provided.

Utilizing embodiments of the disclosure described herein enables simultaneously and concurrently providing data connectivity to client devices with one radio unit and performing an RF spectrum scan with another radio unit within the same wireless network device.

While the invention has been described in terms of various embodiments, the invention should not be limited to only those embodiments described, but can be practiced with modification and alteration within the spirit and scope of the appended claims. The description is to be regarded as illustrative rather than limiting.

What is claimed is:

1. A non-transitory computer readable medium comprising instructions which, when executed by a hardware processor causes the hardware processor to:
   obtain a first information corresponding to a first set of signals to be transmitted wirelessly by a first antenna of a first device;
   transmit, by the first antenna of the first device, the first set of signals;
   receive, by a second antenna of the first device, a second set of signals comprising: the first set of signals transmitted by the first antenna of the first device and a third set of signals transmitted by a second device different than the first device;
   obtain a second information representing the second set of signals received by the second antenna of the first device; and
   based on the first information and the second information, determine a third information;

wherein the first antenna is coupled by a first pathway to a first radio unit that is configured to provide wireless data connectivity to transmit and receive on a first radio frequency (RF) band;

wherein the second antenna is coupled by a second pathway distinct from the first pathway to a band-selectable radio unit that is configured to alternate between providing wireless data connectivity to transmit and receive on a second RF band and performing a spectrum scan on the first RF band concurrently and independently with the first radio unit providing wireless data connectivity on the first RF band; and wherein a third pathway that includes an attenuator couples between a coupler positioned along the first pathway and a combiner positioned along the second pathway, such that signals transmitted by the first pathway from the first radio unit to the first antenna are coupled into the second pathway to prevent receiver compression from occurring in the band-selectable radio unit by operating the second antenna concurrently and independently to the first antenna.

2. The non-transitory computer readable medium of claim 1, wherein the determining of the third information further comprises filtering out information related to the first set of signals from the second information using the first information.

3. The non-transitory computer readable medium of claim 1, wherein the second set of signals further comprises a fourth set of signals transmitted by a third device different than the first device and the second device, and wherein the third information comprises the estimation of the third set of signals and an estimation of the fourth set of signals without the first set of signals.

4. The non-transitory computer readable medium of claim 1, wherein the determining of the third information further comprises applying a phase shift factor to signal information included in the second information.

5. The non-transitory computer readable medium of claim 4, wherein the phase shift factor is dynamically determined based on real-time measurements.

6. The non-transitory computer readable medium of claim 1, wherein the determining of the third information further comprises applying an attenuation factor to signal information, for the first set of signals, included in the first information.

7. The non-transitory computer readable medium of claim 6, wherein the attenuation factor is dynamically determined based on real-time measurements.

8. The non-transitory computer readable medium of claim 1, wherein the instructions causes the hardware processor to:
obtain a fourth information corresponding to a fourth set of signals to be transmitted wirelessly by a third antenna of the first device; and
transmit, by the third antenna of the first device, the fourth set of signals;
wherein the second set of signals, received by the second antenna, comprise: the first set of signals transmitted by the first antenna of the first device, the third set of signals transmitted by the second device, and the fourth set of signals transmitted by the third antenna of the first device, and
wherein the third information comprises the estimation of the third set of signals without the first set of signals and without the fourth set of signals.

9. The non-transitory computer readable medium of claim 1, wherein the first antenna is used for communicating with client devices concurrently with using the second antenna for monitoring wireless data transmitted by other devices.

10. A network device comprising:
a hardware processor;
a first antenna; and
a second antenna,
wherein the network device includes instructions to:
obtain a first information corresponding to a first set of signals to be transmitted wirelessly by the first antenna;
transmit, by the first antenna, the first set of signals;
receive, by the second antenna, a second set of signals comprising:
the first set of signals transmitted by the first antenna and a third set of signals transmitted by a second device different than the network device;
obtain a second information representing the second set of signals received by the second antenna; and
based on the first information and the second information, determine a third information;
wherein the first antenna is coupled to a first radio unit that is configured to provide wireless data connectivity to transmit and to receive on a first radio frequency (RF) band;
wherein the second antenna is coupled to a band-selectable radio unit that is configured to alternate between providing wireless data connectivity to transmit and to receive on a second RF band and performing a spectrum scan on the first RF band concurrently and independently with the first radio unit providing wireless data connectivity on the first RF band; and
wherein the first device prevents receiver compression from occurring in the band-selectable radio unit by combining signals from a first path between the first radio and the first antenna and signals from a second path between the second antenna and the band-selectable radio that is distinct from the first path, based on a third path that includes an attenuator and couples signals from the first path into the second path to cancel out signal components.

11. The network device of claim 10, wherein the determining of the third information further comprises filtering out information related to the first set of signals from the second information using the first information.

12. The network device of claim 10, wherein the second set of signals further comprises
a fourth set of signals transmitted by a third device different than the network device and the second device, and wherein the third information comprises the estimation of the third set of signals and an estimation of the fourth set of signals without the first set of signals.

13. The network device of claim 10, wherein the determining of the third information further comprises applying a phase shift factor to signal information included in the second information.

14. The network device of claim 13, wherein the phase shift factor is dynamically determined based on real-time measurements.

15. The network device of claim 10, wherein the determining of the third information further comprises applying an attenuation factor to signal information, for the first set of signals, included in the first information.

16. The network device of claim 15, wherein the attenuation factor is dynamically determined based on real-time measurements.

17. The network device of claim 10, wherein the network device includes instructions to:
- obtain a fourth information corresponding to a fourth set of signals to be transmitted wirelessly by a third antenna of the network device; and
- transmit, by the third antenna, the fourth set of signals;
- wherein the second set of signals, received by the second antenna, comprise: the first set of signals transmitted by the first antenna, the third set of signals transmitted by the second device, and the fourth set of signals transmitted by the third antenna, and
- wherein the third information comprises the estimation of the third set of signals without the first set of signals and without the fourth set of signals.

18. The network device of claim 10, wherein the first antenna is used for communicating with client devices concurrently with using the second antenna for monitoring wireless data transmitted by other devices.

19. The non-transitory computer readable medium of claim 1, wherein the attenuator is configured based on a sampling loss associated with the first information corresponding to the first set of signals.

20. The non-transitory computer readable medium of claim 1, wherein the phase shifter is situated to operate on the first set of signals before the first antenna transmits the first set of signals.

* * * * *